(12) United States Patent
Li

(10) Patent No.: US 9,829,624 B2
(45) Date of Patent: Nov. 28, 2017

(54) LIGHT GUIDE PLATE ASSEMBLY

(71) Applicant: SHENZHEN CHINA STAR OPTOELECTRONICS TECHNOLOGY CO., LTD., Shenzhen (CN)

(72) Inventor: Quan Li, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/416,359

(22) PCT Filed: Jun. 27, 2014

(86) PCT No.: PCT/CN2014/081028
§ 371 (c)(1),
(2) Date: Jan. 22, 2015

(87) PCT Pub. No.: WO2015/188407
PCT Pub. Date: Dec. 17, 2015

(65) Prior Publication Data
US 2017/0082795 A1    Mar. 23, 2017

(30) Foreign Application Priority Data
Jun. 12, 2014    (CN) .......................... 2014 1 0260368

(51) Int. Cl.
*G02B 6/00* (2006.01)
*F21V 8/00* (2006.01)

(52) U.S. Cl.
CPC ................................. *G02B 6/0088* (2013.01)

(58) Field of Classification Search
CPC ............................. G02B 6/0093; G02B 6/0088
See application file for complete search history.

(56) References Cited

U.S. PATENT DOCUMENTS 6,490,016 B1    12/2002 Koura
8,740,446 B2    6/2014 Huang et al.
(Continued)

FOREIGN PATENT DOCUMENTS

CN    201359237 Y    12/2009
CN    102192448 A    9/2011
(Continued)

OTHER PUBLICATIONS

Office Action dated Feb. 19, 2016, by the State Intellectual Property Office of China in corresponding Chinese Patent Application No. 201410260368.1. (7 pages).
(Continued)

*Primary Examiner* — Julie Bannan
(74) *Attorney, Agent, or Firm* — Buchanan Ingersoll & Rooney PC

(57) ABSTRACT

The present disclosure relates to the field of production of liquid crystal displays, in particular to a light guide plate assembly, comprising: a light guide plate which includes a first side edge for introducing light and a second side edge through which no light can be introduced, and a frame for fixing the light guide plate, the frame at least partially surrounding the second side edge of the light guide plate, wherein a buffer member that is at least partially deformable in an elastic manner is disposed between the frame and the second side edge of the light guide plate.

6 Claims, 9 Drawing Sheets

(56) References Cited

U.S. PATENT DOCUMENTS

| | | | | |
|---|---|---|---|---|
| 8,882,332 B2* | 11/2014 | Que | ................ | F21V 19/004 362/217.13 |
| 2003/0164903 A1* | 9/2003 | Saito | ................ | G02F 1/133615 349/58 |
| 2012/0086883 A1* | 4/2012 | Wakita | ................ | G02B 6/002 349/61 |
| 2012/0120326 A1* | 5/2012 | Takata | ................ | G02B 6/0061 348/790 |
| 2012/0170311 A1* | 7/2012 | Huang | ................ | G02B 6/0088 362/611 |
| 2012/0287371 A1* | 11/2012 | Oura | ................ | G02F 1/133615 349/60 |
| 2013/0258236 A1* | 10/2013 | Zhang | ................ | G02B 6/0088 349/60 |
| 2014/0268880 A1* | 9/2014 | He | ................ | G02B 6/0088 362/632 |
| 2014/0313773 A1* | 10/2014 | Wu | ................ | G02B 6/0081 362/612 |

FOREIGN PATENT DOCUMENTS

| | | |
|---|---|---|
| CN | 103244868 A | 8/2013 |
| CN | 103883942 A | 6/2014 |
| JP | 2002156632 A | 5/2002 |
| TW | 554214 B | 9/2003 |

OTHER PUBLICATIONS

International Search Report (Form PCT/ISA/210) and Written Opinion (Form PCT/ISA/237) dated Mar. 11, 2015, by the State Intellectual Property Office of China in corresponding International Application No. PCT/CN2014/081028. (11 pages).

* cited by examiner

LIGHT GUIDE PLATE ASSEMBLY

CROSS-REFERENCE TO RELATED APPLICATIONS

The present application claims benefit of Chinese patent application CN 201410260368.1, entitled "Light Guide Plate Assembly" and filed on Jun. 12, 2014, the entirety of which is incorporated herein by reference.

FIELD OF THE INVENTION

The present disclosure relates to the field of production of liquid crystal displays, in particular to a light guide plate assembly used in backlights.

BACKGROUND OF THE INVENTION

The light guide plate is one of the most important components in the backlight module of a display. Light guide plates in the prior art are substantially made from polymethyl methacrylate (PMMA), which has a relatively high coefficient of thermal expansion. In order to facilitate free expansion of the light guide plate, an expansion gap should be provided in advance between the light guide plate and the frame for fixing the light guide plate within a backlight module.

However, on the one hand, an oversized expansion gap provided in advance would affect the optical efficiency of the backlight module, and prevent the frame for fixing the light guide plate from compactly fixing the light guide plate. Therefore, the light guide plate would shake to a certain extent, as a result of which the optical film on the light guide plate would be easily subjected to friction and scratch. On the other hand, an undersized expansion gap provided in advance would lead to insufficient space for accommodating the light guide plate after thermal expansion. As a result, the light guide plate would be compressed at its side edges and arch up, thus inevitably rendering abnormality of display quality.

SUMMARY OF THE INVENTION

In an existing backlight module, an expansion gap for thermal expansion of the light guide plate is provided in advance between the light guide plate and the frame for fixing the light guide plate. An oversized or undersized expansion gap would impose negative influences on the backlight module. For example, the existence of such expansion gap would lower the optical efficiency of the backlight module, because the optical film on the light guide plate would be scratched due to insecure fixing, or the light guide plate would be compressed and arch up after thermal expansion due to insufficient expansion gap.

Aiming at the above problems, the present disclosure provides a light guide plate assembly, comprising: a light guide plate and a frame for fixing the light guide plate. The light guide plate includes a first side edge for introducing light and a second side edge through which no light is introduced, and the frame at least partially surrounds the second side edge of the light guide plate. A buffer member that is at least partially deformable in an elastic manner is disposed between the frame and the second side edge of the light guide plate.

Preferably, the buffer member comprises a support portion which is not capable of being deformed in an elastic manner and an elastically deformable function portion that are engaged with each other into one piece in an engagement area.

Preferably, the support portion is configured to be a plate body having a flat surface and two hollow areas adjacent to two opposite sides of the engagement area respectively. The orthographic projection region formed by areas of the function portion that are not engaged with the plate body on the flat surface completely falls within the hollow areas. The hollow areas are provided essentially for optimizing the mechanical properties of the buffer member, such that the function portion can be elastically deformed in a more natural and flexible manner, and would be less likely to be broken off or unnaturally deformed.

Preferably, the function portion is configured to be a curved sheet, which extends from the engagement area at one side of the plate body, with a convex surface facing the plate body and a concave surface facing the second side edge of the light guide plate. The term "curved sheet" substantially refers to sheets having smoothly curved cross sections, and does not include those having obvious angles in the cross sections thereof.

Preferably, the engagement area is arranged at a vertex of the curved sheet, which is mirror symmetrical relative to a central plane where the vertex is located, the central plane being perpendicular both to the flat surface of the plate body and to a surface of the light guide plate. The curved sheet is essentially a surface formed by a plurality of arc lines tiled along the lateral direction thereof. Each "vertex" corresponds to one arc line. Hence, the curved sheet has a plurality of "vertexes" which form a line segment along the lateral direction of the curved sheet. Therefore, "the vertexes of the curved sheet" together form a line segment along the lateral direction of the curved sheet.

Preferably, the curved sheet has a rectangular orthographic projection on the flat surface of the plate body, and a relationship $A1 \geq A2+D1$ is satisfied, in which A1 represents the distance between two respective end edges of the two hollow areas away from the engagement area; A2 represents the distance between two opposite end edges of the curved sheet; and D1 represents the distance between either of the two end edges of the curved sheet and the flat surface of the plate body facing the curved sheet. The plate body and curved sheet of the buffer member are formed in this way, for purpose of optimized mechanical properties. On the one hand, the light guide plate can be firmly supported and fixed. On the other hand, an elastic buffer space can be flexibly provided for expansion of the light guide plate. Therefore, a best compromise can be achieved between the above two functions.

Preferably, the function portion is configured to be a folded sheet, which extends from the engagement area on one side of the plate body, with an exterior angled surface facing the plate body and an interior angled surface facing the second side edge of the light guide plate. The term "folded sheet" herein mainly refers to a sheet body having an obvious angle in its cross section, the majority part of the folded sheet generally being a flat surface.

Preferably, an end of the folded sheet is provided with an arcuate area bent toward the plate body, with a convex surface thereof abutting against the second side edge of the light guide plate. This structure enables a relatively gentle pressure to be applied to the second side edge of the light guide plate by the arcuate area, and thus avoids easy damage to the second side edge of the light guide plate and to the folded sheet itself.

Preferably, the folded sheet has a folded part smoothly arranged in the engagement area, thus preventing fatigue or rupture of the folded sheet at the folded part and ensuring a long service life of the entire buffer member.

Preferably, the support portion of the buffer member is formed integrally with the frame, thus being free from additional costs of time, working procedures, materials, and funds.

In the light guide plate assembly of the present application, arrangement of the buffer member on the frame brings about the following advantages.

On the one hand, the function portion of the buffer member closely abuts against the light guide plate assembly without play, which guarantees a high optical efficiency of the entire backlight module, and meanwhile allows the frame to tightly fix the light guide plate. Such being the case, the light guide plate would not shake, thus avoiding friction and scratch of the optical film on the light guide plate.

On the other hand, since the function portion of the buffer member is elastically deformable, it will be compressed to provide sufficient space for accommodating the light guide plate when it is thermally expanded. As a result, the light guide plate would be prevented from arching up under rigid pressure, thus ensuring a high display quality of the display.

The above technical features can be combined in any suitable manner or replaced by any equivalent technical features so long as the purpose of the present disclosure can be achieved.

BRIEF DESCRIPTION OF THE DRAWINGS

The present disclosure will be described in more detail in light of the embodiments and drawings, wherein.

In the accompanying drawings, the same components are indicated by the same reference signs. The accompanying drawings are not drawn to actual scale.

DETAILED DESCRIPTION OF THE EMBODIMENTS

The present disclosure will be further explained with reference to the accompanying drawings.

Figure 1:
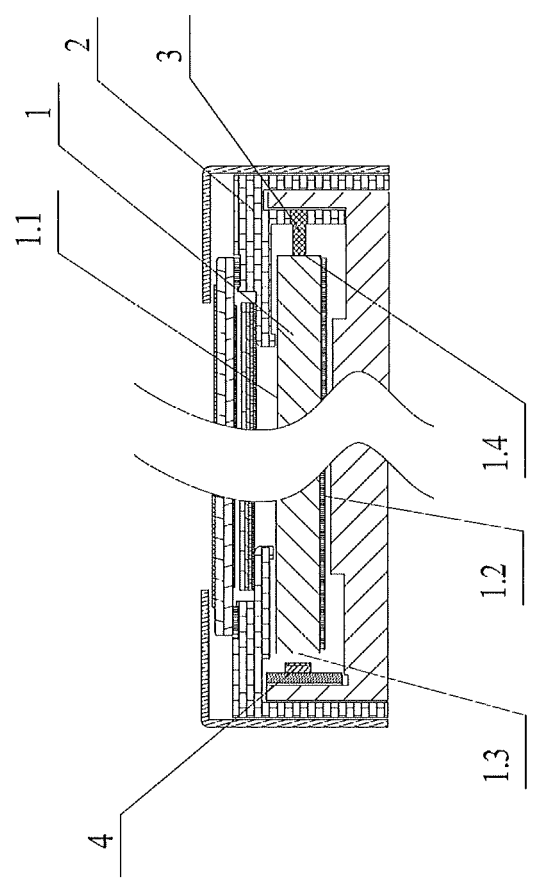
FIG. 1 shows a section view of a liquid crystal display equipped with a light guide plate assembly of the present disclosure.

FIG. 1 shows a section view of a liquid crystal display equipped with a light guide plate assembly of the present disclosure. The light guide plate assembly according to the present disclosure comprises a light guide plate 1 and a frame 2 used for fixing the light guide plate 1.

The light guide plate 1 includes a first side edge 1.3 for introducing light and a second side edge 1.4 through which no light is introduced. As clearly illustrated in FIG. 1, in the backlight module of a typical liquid crystal display, a light-emitting element 4 is usually provided at a side of the light guide plate 1. In the embodiment as shown in FIG. 1, the light-emitting element 4 is arranged adjacent to the first side edge 1.3 of the light guide plate 1 for introducing light, such that light from the light-emitting element 4 can pass through the first side edge 1.3 into the light guide plate 1.

Typically, the light-emitting element 4 can be a light-emitting diode (LED). Blue LEDs of high luminous efficiency are currently used, with phosphor or a quantum strip arranged between the blue LED and the light guide plate 1. The phosphor or the quantum strip can be stimulated to produce complementary light of the blue light, so that the light finally entering the light guide plate 1 through the first side edge 1.3 are white light of full color.

A reflective film 1.2, which is arranged on a bottom surface of the light guide plate 1, can lock the light inside the light guide plate 1. The light can be transformed into a homogenous surface light source via reflection, scattering, refraction or the like by an optical film of the light guide plate 1, and then exit from a top surface 1.1 of the light guide plate 1, finally entering the liquid crystal cell after being optically homogenized. The light from the light guide plate 1 passes through an array substrate, a liquid crystal layer (wherein the polarization state of the light is changed by the liquid crystal), and a color filter substrate (wherein the light can be divided into three-primary colors and form specific colors as required for the display through mutual harmonization) within the liquid crystal cell, and finally exits. In this way, specific images can be presented on the screen of the liquid crystal display.

Figure 2:
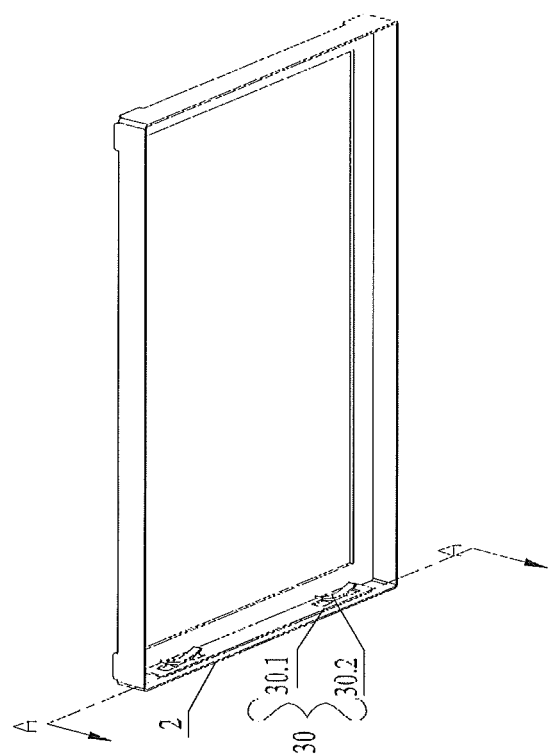
FIG. 2 shows a frame of the light guide plate assembly according to a first embodiment of the present disclosure.

The frame 2, which is mainly used for supporting and fixing the light guide plate 1, can be arranged surrounding four edges of the light guide plate 1. For the purposes of a complete fixation, gravity balance of the entire liquid crystal display, and engagement between the frame 2 and other support elements in the liquid crystal display, for example, a backboard, a support plate arranged with light-emitting elements such as an LED light bar, or a clip, the frame 2 is preferably configured as a rectangular frame as shown in FIG. 2, which covers all edges of the light guide plate 1. However, the technical solution of the present disclosure cannot be effectively performed unless the frame 2 at least partially encloses the second side edge 1.4 of the light guide plate 1 through which no light is introduced.

According to the present disclosure, a buffer member 3 at least partially deformable in an elastic manner is arranged between the frame 2 and the second side edge 1.4 of the light guide plate 1. As previously mentioned, the second side edge 1.4 is the edge of the light guide plate 1 through which no light is introduced. The buffer member 3 is arranged at a location on the frame 1 corresponding to the second side edge 1.4, rather than the first side edge 1.3, of the light guide plate 1, and therefore will not affect the optical design of the light-emitting element 4, or normal transmission of the light.

Such arrangement allows a certain buffer space between the frame 2 and the second side edge 1.4 of the light guide plate 1 due to an elastic deformation of the buffer member 3. The light guide plate 1 is placed into the frame 2 with the second side edge 1.4 thereof abutting against the buffer member 3. When the light guide plate 1 is thermally expanded, the buffer member 3 deforms in an elastic manner so as to freely adjust the distance between the frame 2 and the second side edge 1.4 of the light guide plate 1. Meanwhile, since the buffer member 3 deforms essentially under compression of the expanded light guide plate 1, the buffer member 3 and the light guide plate 1 constantly fit to each other, thus ensuring that the light guide plate 1 is fixed all the time.

In this way, the light guide plate 1 is provided with a certain buffer space, and thus will not arch up under a rigid compressing force so long as the thermal expansion thereof does not exceed the range of elastic deformation of the buffer member 3, which can be achieved via a proper design. As such, the normal display quality will not be negatively affected. On the other hand, during the entire deformation process, the buffer member 3 constantly has one side closely abutting against the second side edge 1.4 of the light guide plate 1, and another side fixed to the frame, and therefore can firmly lock the light guide plate 1. Hence, no room that would cause looseness exists in the periphery of the light guide plate 1, thus preventing the optical film being scratched due to shaking of the light guide plate 1.

FIG. 2 shows a frame 2 of the light guide plate assembly according to a first embodiment of the present disclosure. A buffer member 30 is arranged at a place where the frame 2 faces the second side edge 1.4 of the light guide plate 1. As is readily understood, the latter is placed inside the frame 2, and thus not shown in the figure.

Figure 3:
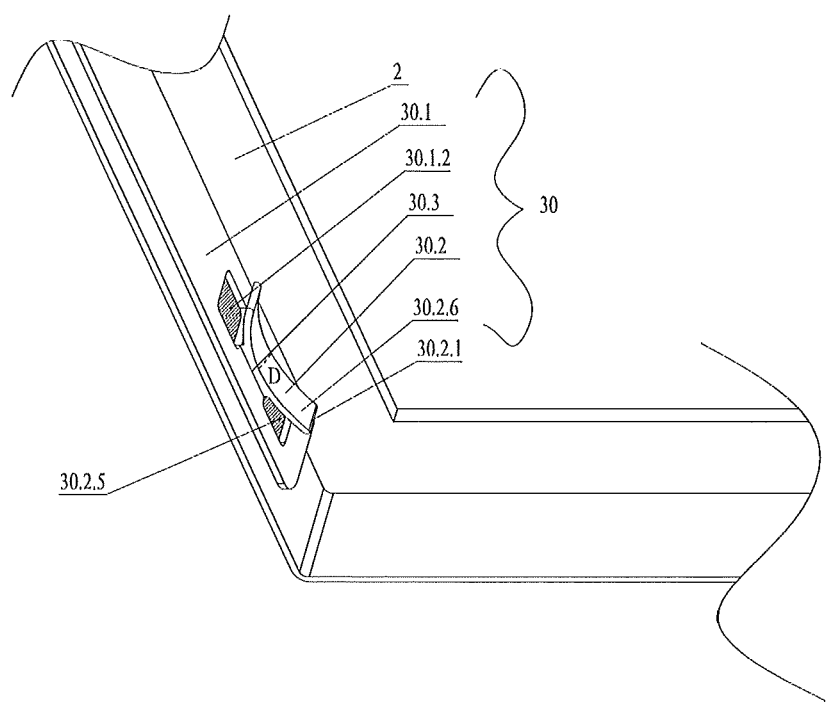
FIG. 3 shows a partial detail view of a buffer member arranged in the frame as shown in FIG. 2.

FIG. 3 shows a partial detail view of the buffer member 30 arranged in the frame 2 as shown in FIG. 2. In the embodiment as shown in FIG. 3, the buffer member 30 comprises a support portion 30.1 not capable of being deformed in an elastic manner and an elastically deformable function portion 30.2 that are combined with each other into one piece in an engagement area 30.3.

The support portion 30.1 and the frame 2 are fixedly engaged with each other, which can be achieved through a plurality of ways in the prior art, such as welding and gluing. However, when simple procedural processes and low cost of materials are taken into account, the support portion 30.1 is most preferably formed with the frame 2 in an integral manner. Since the support portion 30.1 and the frame 2 are fixedly engaged with each other, the entire frame 2 can be tightly fit with the light guide plate 1 via the buffer member 30, which will be described in the following, and fix the light guide plate 1 against any space for shaking thereof. On the other hand, since the function portion 30.2 is elastically deformable, it will be compressed and deformed adaptively so as to provide a space for expansion of the light guide plate 1 when the light guide plate 1 is thermally expanded. In the prior art, however, the frame compresses the light guide plate 1 in a rigid manner, which would cause the latter to arch up. Meanwhile, it can be easily understood that, when the light guide plate 1 restores as it cools down, the function portion 30.2 will correspondingly restore also. As long as the function portion 30.2 is properly designed, which can be easily achieved by one skilled in the art, the critical value of the elastic deformation will not be exceeded. In the entire process from elastic deformation to restoration, the light guide plate 1 and the function portion 30.2 of the buffer member 30 constantly fit to each other closely, thus ensuring that the light guide plate 1 is firmly fixed in the frame 2 without being shaken.

In the embodiment as shown in FIG. 3, the support portion 30.1 is configured to be a plate body 30.1 having a flat surface and two hollow areas 30.1.2 adjacent to two opposite sides of the engagement area 30.3 respectively. The orthographic projection region formed by areas of the function portion 30.2 that are non-engaged with the plate body 30.1 on the flat surface completely falls within the hollow areas 30.1.2. For the sake of convenient observations, the hollow areas 30.1.2 are indicated by hatched lines in FIG. 3. That is, in the regions that are covered by hatched lines, the plate body 30.1 is hollowed.

The hollow areas 30.1.2 are arranged primarily to optimize mechanical properties of the buffer member 30, so as to enable more natural and flexible deformation of the function portion 30.2 and reduce risks of break or unnatural deformation thereof. The two hollow areas 30.1.2 at the two opposite sides of the plate body 30.1 in the engagement area 30.3 can reduce constraint imposed on the engagement area 30.3 by its peripheral regions, so that more gentle and natural engagement between the function portion 30.2 and the plate body 30.1 can be achieved. Therefore, the function portion 30.2 can be more freely deformed without being pulled or constrained by the rigid plate body 30.1 which is not capable of being deformed in an elastic way, nor can it be broken under partially inhomogeneous forces.

In the embodiment as shown in FIG. 3, the function portion 30.2 can be configured to be a curved sheet 30.2, which extends from the engagement area 30.3 at one side of the plate body 30.1, and has a convex surface 30.2.5 facing the plate body 30.1 and a concave surface 30.2.6 facing the second side edge 1.4 of the light guide plate 1 (which is not shown in FIG. 3, but can be easily understood with reference to FIG. 1).

It should be noted that in the first embodiment according to the present disclosure, the term "curved sheet" mainly refers to a sheet body having a smooth arc cross section without angles.

FIG. 3 clearly indicates that the engagement area 30.3 is arranged at a vertex of the curved sheet 30.2, which is mirror symmetrical relative to a central plane where the vertex is located. The central plane is perpendicular both to the flat surface of the plate body 30.1 and to a surface of the light guide plate 1.

In terms of solid geometry, "vertexes of the curved sheet 30.2" as a whole form a line segment along a lateral direction of the curved sheet. The curved sheet 30.2 can be essentially a surface formed by a plurality of arc lines tiled along a lateral direction thereof. Each "vertex" corresponds to one arc line. Hence, the curved sheet has a plurality of "vertexes" which form a line segment along the lateral direction of the curved sheet (which is schematically shown in FIG. 3 by dotted line D).

As to the "central plane", it can be defined in the follow three aspects.

First, the above line segment (dotted line D in FIG. 3) formed by the "vertexes" is placed within the central plane.

Second, the central plane is perpendicular to the flat surface of the sheet body 30.1.

Third, the central plane is perpendicular to a surface of the light guide plate 1, i.e., the plane direction of the screen of the entire liquid crystal display.

That is, the central plane, the flat surface of the plate body 30.1, and the surface of the light guide plate 1 can form the three datum planes of a space rectangular coordinate system. Furthermore, the line segment constituted by the "vertexes" of the curved sheet 30.2 is within the central plane, and the curved sheet 30.2 is mirror symmetrical relative to the central plane. As can be easily understood from FIG. 3, the central plane is essentially a plane relative to which the curved sheet 30.2 is symmetrical. That is, the curved sheet 30.2 is a mirror symmetrical structure relative to the central plane, while the "vertex" is the midpoint of the arc segment in the cross section of the curved sheet.

The terms "vertex" and "central plane" should certainly be understood from a viewpoint in mechanical field, and therefore the places indicated thereby should be understood as including allowable tolerance in mechanical field, rather than being strict geometrical configurations.

Figure 4:
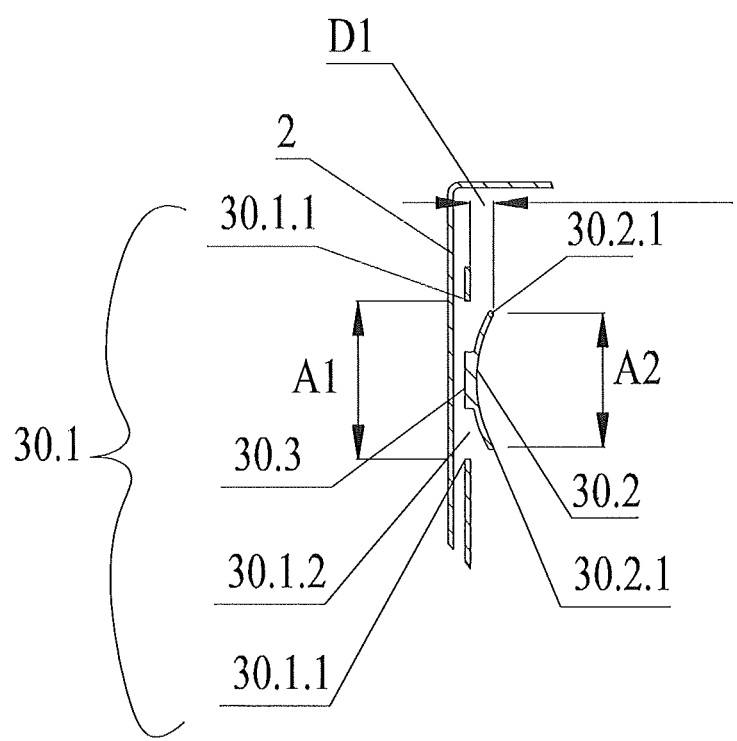
FIG. 4 shows a section view of the frame as shown in FIG. 2 along line A-A.

FIG. 4 is a section view of the frame as shown in FIG. 2 along line A-A. In the following, the preferable size of the buffer member 30 will be explained in view of FIG. 4. It can be easily understood that in the embodiment as shown in FIG. 4, the curved sheet 30.2 has a rectangular orthographic projection on the flat surface of the plate body 30.1. Preferably, the size of the buffer member 30 satisfies the following formula: A1≥A2+D1. As indicated in FIG. 4, A1 represents the distance between two respective end edges 30.1.1 of the two hollow areas 30.1.2 away from the engagement area 30.3; A2 represents the distance between two opposite end edges 30.2.1 of the curved sheet 30.2; and D1 represents the distance between either of the two end edges 30.2.1 of the curved sheet 30.2 and the flat surface of the plate body 30.1 facing the curved sheet 30.2.

The mechanical properties of the buffer member 30 can be optimized when the plate body 30.1 and the curved sheet 30.2 thereof are constructed in accordance with the above sizes. The plate body 30.1 can adequately fulfill its functions of fixation and support, without affecting or constraining free elastic deformation of the curved sheet 30.2. As such, the buffer member 30 can on the one hand firmly support and fix the light guide plate 1, and on the other hand flexibly provide a buffer space for the expansion of the light guide plate 1, by means of which a best compromise of the two functions can be achieved. That is, requirements in the two aspects are simultaneously satisfied, without causing tearing or obstruction between and among components in the buffer member 30.

In the following, the procedure of how the buffer member 30 functions will be specifically explained.

Figure 5:
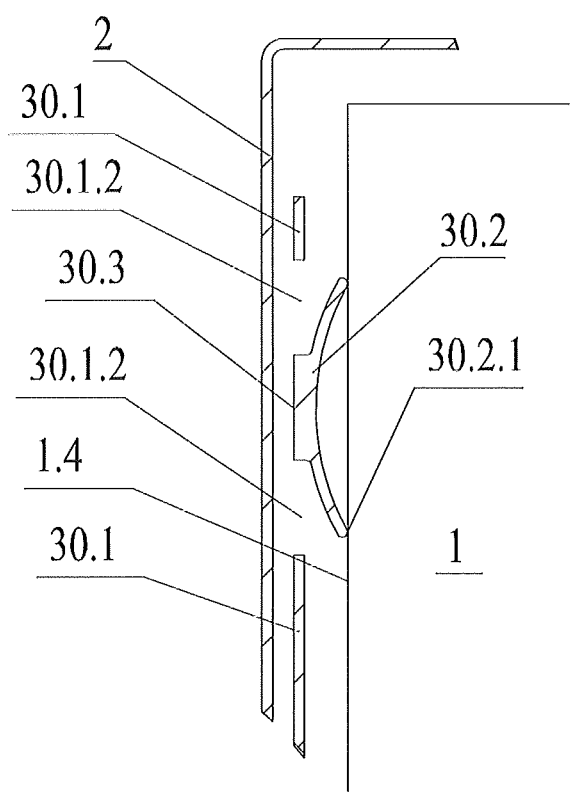
FIG. 5 shows a first state of the light guide plate assembly according to the first embodiment of the present disclosure, wherein the light guide plate is in a natural state.

FIG. 5 shows a first state of the light guide plate assembly according to the first embodiment of the present disclosure, wherein the light guide plate 1 is in a natural state (i.e., non-expanded). It can be seen that the function portion 30.2 (i.e., the curved sheet 30.2) of the buffer member 30 is not obviously deformed at this time, and the two end edges 30.2.1 of the curved sheet 30.2 closely abut against the second side edge 1.4 of the light guide plate 1, as a result of which, the frame 2 can press the light guide plate 1 via the buffer member 30 against random shaking of the light guide plate 1.

Figure 6:
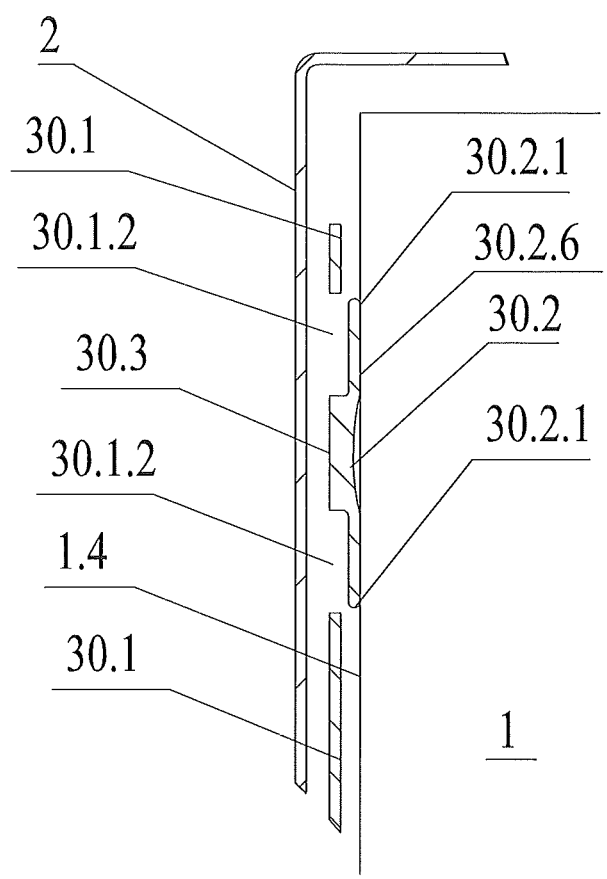
FIG. 6 shows a second state of the light guide plate assembly according to the first embodiment of the present disclosure, wherein the light guide plate is in a thermally expanded state.

FIG. 6 indicates a second state of the light guide plate assembly according to the first embodiment of the present disclosure, wherein the light guide plate 1 is in a thermally expanded state. As can be clearly seen in FIG. 6, the function portion 30.2 (i.e., the curved sheet 30.2) is evidently deformed under compression by the thermally expanded light guide plate 1. At this time, the entire concave surface 30.2.6 of the curved sheet 30.2 fits to the second side edge 1.4 of the light guide plate 1. As can be readily seen and understood, during the thermal expansion of the light guide plate 1 and the deformation of the curved sheet 30.2 under compression, the end edges 30.2.1 of the curved sheet 30.2 constantly abut against the second side edge 1.4 of the light guide plate 1. As such, during the entire expansion process, the light guide plate 1 is pressed by the fame 2 via the buffer member 30 against random shaking of the light guide plate 1.

Figure 7:
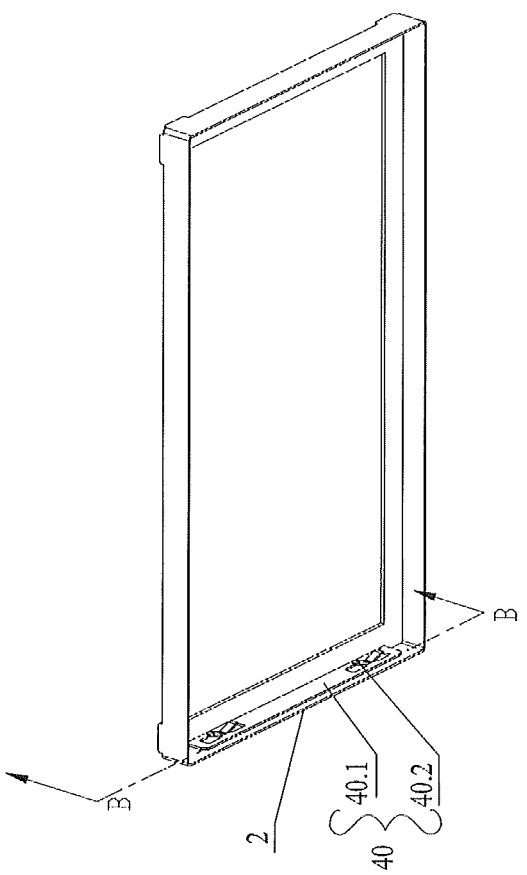
FIG. 7 shows a frame of the light guide plate assembly according to a second embodiment of the present disclosure.

FIG. 7 shows a frame 2 of the light guide plate assembly according to a second embodiment of the present disclosure. Similarly to the first embodiment, in the second embodiment, a buffer member 40 is arranged at a place where the frame 2 faces the second side edge 1.4 of the light guide plate 1. As is readily understood, the second side edge 1.4 is placed inside the frame 2 but not shown in the figure.

Figure 8:
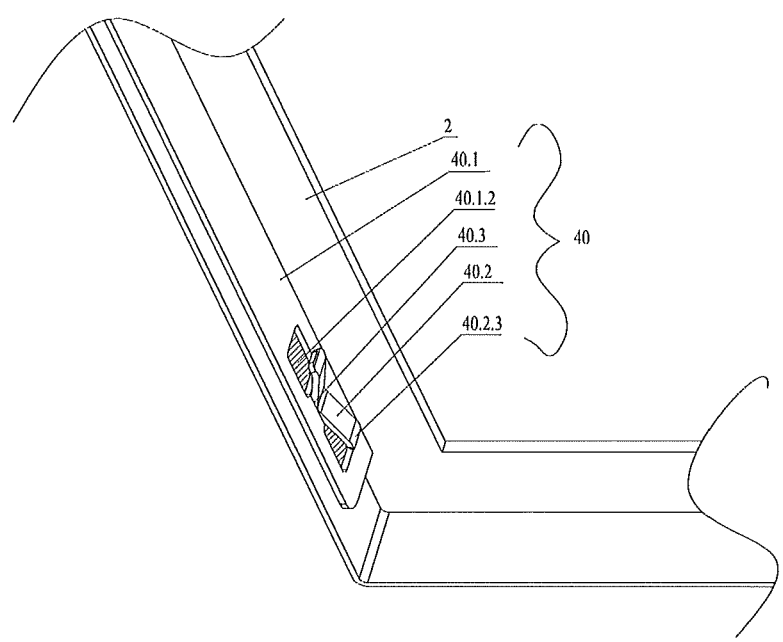
FIG. 8 shows a partial detail view of the buffer member arranged in the frame as shown in FIG. 7.

FIG. 8 shows a partial detail view of the buffer member 40 arranged in the frame 2 as shown in FIG. 7. In the embodiment as shown in FIG. 8, the buffer member 40 comprises a support portion 40.1 not capable of being deformed in an elastic manner and an elastically deformable function portion 40.2 that are engaged with each other into one piece in an engagement area 40.3. The support portion 40.1 is configured to be a plate body 40.1 having a flat surface and two hollow areas 40.1.2 adjacent to two opposite sides of the engagement area 40.3 respectively. The orthographic projection region formed by areas of the function portion 40.2 that are not engaged with the plate body 40.1 on the flat surface completely falls within the hollow areas 40.1.2. For the sake of convenient observations, the hollow areas 40.1.2 are indicated by hatched lines. That is, in the regions that are covered by hatched lines, the plate body 40.1 is hollowed.

These technical features are not substantially different from the respective technical features of the first embodiment. The functions and advantages of these features are explained in detail in the above, and therefore will not be repeated here. In the following, only the technical features that are essentially different from those of the first embodiment will be specifically described.

Figure 9:
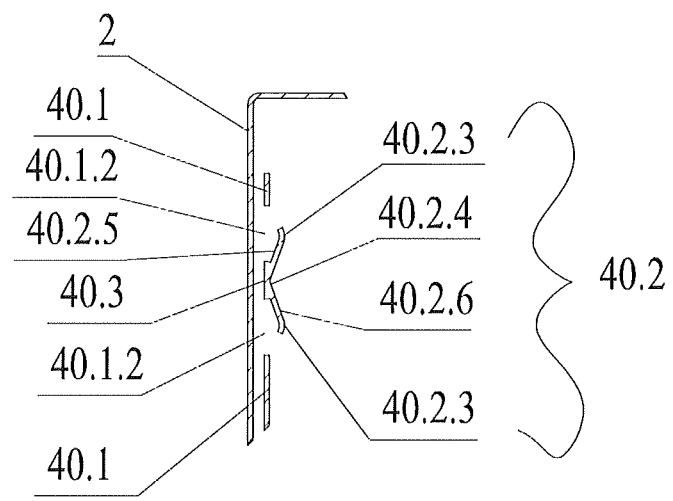
FIG. 9 shows a section view of the frame as shown in FIG. 7 along line B-B.

FIG. 9 is a section view of the frame as shown in FIG. 7 along line B-B. FIG. 9 only illustrates different features of the second embodiment from the first embodiment. In the second embodiment, the function portion 40.2 is configured to be a folded sheet 40.2, which extends from the engagement area 40.3 on one side of the plate body 40.1, with an exterior angled surface 40.2.5 facing the plate body 2 and an interior angled surface 40.2.6 facing the second side edge 1.4 of the light guide plate 1. In the second embodiment, the term "folded sheet" mainly indicates a sheet body with an obvious angle in its cross section, the majority part of the folded sheet being a flat surface.

In the second embodiment, the function portion 40.2 of the buffer member 40 is no longer a curved sheet having a smoothly curved cross section in its entirety, but rather a folded sheet with a folded part 40.2.4. The folded sheet has an obvious angle in its cross section, the majority part of the folded sheet being a flat surface.

A folded sheet has different mechanical properties relative to a curved sheet. Differences exist between the stiffness coefficients of a deformed curved sheet and of a deformed folded sheet, between the deformation intensities in the surface direction of the plate bodies 30.1 and 40.1, and between the deformation intensities in the normal directions of the plate bodies 30.1 and 40.1. Therefore, the present disclosure provides two alternatives, which can be properly selected depending on the thermal expansion coefficient of the light guide plate 1 and material of the frame 2.

Preferably, the folded part 40.2.4 of the folded sheet 40.2, which is located in the engagement area 40.3 and is the fragilest portion of the folded sheet 40.2, is smoothly arranged so as to disperse the compression force imposed thereupon due to deformation. Hence, fatigue or breakage of the folded sheet 40.2 can be avoided, thus ensuring the service life of the entire buffer member 40. The folded sheet 40.2 can be arranged symmetrical relative to its folded part 40.2.4.

Preferably, an end of the folded sheet 40.2 includes an arcuate area 40.2.3 bent toward the plate body 40.1, with a convex surface thereof abutting against the second side edge 1.4 of the light guide plate 1. The arcuate area 40.2.3 merely locates at an end portion of the folded sheet 40.2. That is, a majority part of the folded sheet 40.2 is still planar. The arcuate area 40.2.3 is mainly used to form a gentle bearing area for closely abutting against the second side edge 1.4 of the light guide plate 1. In the buffer member 40 according to the present disclosure, this abutting status would be constantly maintained both when the light guide plate 1 is in a natural state and when it is in a thermal expansion state. Thus, through contact between the smooth convex surface of the arcuate area 40.2.3 and the second side edge 1.4 of the light guide plate 1, the arcuate area 40.2.3 imposes a relatively gentle force upon the second side edge 1.4 of the light guide plate 1, and thus would not easily damage the second side edge 1.4 of the light guide plate 1. At the same time, the folded sheet 40.2 itself can also be prevented from being damaged. In this way, a long service life of the buffer member 40 can be further guaranteed.

The arrangement of the buffer member on the frame enables the light guide plate assembly of the present disclosure to have the following advantages.

On the one hand, the function portion of the buffer member closely abuts against the light guide plate assembly without play, which guarantees a high optical efficiency of the entire backlight module, and meanwhile allows the frame to tightly fix the light guide plate. Such being the case, the light guide plate would not shake, thus avoiding friction and scratch of the optical film on the light guide plate.

On the other hand, since the function portion of the buffer member is elastically deformable, it will be compressed to provide sufficient space for accommodating the light guide plate when it is thermally expanded. As a result, the light guide plate would be prevented from arching up under rigid pressure, thus ensuring a high display quality of the display.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

The invention claimed is:

1. A light guide plate assembly, comprising:
a light guide plate which includes a first side edge for introducing light and a second side edge through which no light is introduced, and
a frame for fixing the light guide plate, the frame at least partially surrounding the second side edge of the light guide plate,
wherein a buffer member that is at least partially deformable in an elastic manner is only disposed between the frame and the second side edge of the light guide plate, and
the first side edge and the second side edge are arranged parallel to each other;
wherein the buffer member comprises a support portion not capable of being deformed in an elastic manner and an elastically deformable function portion that are engaged with each other into one piece in an engagement area;
wherein the support portion is configured to be a plate body having a flat surface and two hollow areas adjacent to two opposite sides of the engagement area respectively;
wherein an orthographic projection region of the function portion that are not engaged with the plate body on the flat surface completely falls within the hollow areas; and
wherein the function portion is configured to be a curved sheet, which extends from the engagement area at one side of the plate body, with a convex surface facing the plate body and a concave surface facing the second side edge of the light guide plate.

2. The light guide plate assembly according to claim 1, wherein the engagement area is arranged at a vertex of the curved sheet, which is mirror symmetrical relative to a central plane where the vertex is located, the central plane being perpendicular both to the flat surface of the plate body and to a surface of the light guide plate.

3. The light guide plate assembly according to claim 2, wherein the curved sheet has a rectangular orthographic projection on the flat surface of the plate body, and
wherein a relationship $A1 \geq A2+D1$ is satisfied, in which
A1 represents the distance between two respective end edges of the two hollow areas away from the engagement area;
A2 represents the distance between two opposite end edges of the curved sheet; and
D1 represents the distance between either of the two end edges of the curved sheet and the flat surface of the plate body facing the curved sheet.

4. A light guide plate assembly comprising:
a light guide plate which includes a first side edge for introducing light and a second side edge through which no light is introduced, and
a frame for fixing the light guide plate, the frame at least partially surrounding the second side edge of the light guide plate,
wherein a buffer member that is at least partially deformable in an elastic manner is only disposed between the frame and the second side edge of the light guide plate, and
the first side edge and the second side edge are arranged parallel to each other;
wherein the buffer member comprises a support portion not capable of being deformed in an elastic manner and an elastically deformable function portion that are engaged with each other into one piece in an engagement area;
wherein the support portion is configured to be a plate body having a flat surface and two hollow areas adjacent to two opposite sides of the engagement area respectively;
wherein an orthographic projection region of the function portion that are not engaged with the plate body on the flat surface completely falls within the hollow areas;
wherein the function portion is configured to be a folded sheet, which extends from the engagement area on one side of the plate body, with a first angled surface facing the plate body and a second angled surface facing the second side edge of the light guide plate; and
wherein an end of the folded sheet is provided with an arcuate area bent toward the plate body, with a convex surface thereof abutting against the second side edge of the light guide plate.

5. The light guide plate assembly according to claim 4, wherein a folded part of the folded sheet is arranged smoothly in the engagement area.

6. The light guide plate assembly according to claim 1, wherein the support portion of the buffer member is formed integrally with the frame.

* * * * *